United States Patent [19]

Duncan

[11] Patent Number: 5,253,762
[45] Date of Patent: Oct. 19, 1993

[54] STACKING, COUNTING AND SORTING DEVICE FOR FLEXIBLE, PLANAR FOOD PRODUCTS

[75] Inventor: Daryl G. Duncan, Yakima, Wash.

[73] Assignee: Arr-Tech Manufacturing, Inc., Zillah, Wash.

[21] Appl. No.: 831,934

[22] Filed: Feb. 6, 1992

[51] Int. Cl.5 .............................................. B07C 5/00
[52] U.S. Cl. ................................... 209/552; 209/642; 209/651; 414/790.6; 414/794.4
[58] Field of Search ............... 209/551, 552, 576, 638, 209/642, 651; 271/207, 213; 414/790.6, 790.5, 794.4

[56] References Cited

U.S. PATENT DOCUMENTS

| | | | |
|---|---|---|---|
| 2,414,059 | 1/1947 | Powers | 414/790.6 |
| 2,723,606 | 11/1955 | Brockardt et al. | 414/794.4 |
| 3,027,817 | 4/1962 | Loeffler | 414/790.5 |
| 3,202,302 | 8/1965 | Insolio . | |
| 3,237,753 | 3/1966 | Allen et al. | 198/129 |
| 3,272,351 | 9/1966 | Burton et al. . | |
| 3,300,065 | 1/1967 | Witmer . | |
| 3,318,351 | 5/1967 | Werder | 146/94 |
| 3,390,619 | 7/1968 | Williams | 414/790.6 |
| 3,392,853 | 7/1968 | Mitchell et al. . | |
| 3,406,966 | 10/1968 | Walton . | |
| 3,525,443 | 8/1970 | Pomara, Jr. . | |
| 3,592,329 | 7/1971 | Fleischauer | 198/81 |
| 3,771,671 | 11/1973 | Cathers . | |
| 3,908,835 | 9/1975 | Lubas . | |
| 3,915,316 | 10/1975 | Pomara, Jr. . | |
| 3,955,665 | 5/1976 | Pettis, Jr. et al. | 198/39 |
| 3,971,481 | 7/1976 | Longenecker et al. . | |
| 4,027,580 | 6/1977 | Sundin | 93/93 |
| 4,256,214 | 3/1981 | Back, Jr. | 198/367 |
| 4,304,508 | 12/1991 | Wolf | 406/78 |
| 4,405,186 | 9/1983 | Sandberg et al. | 414/21 |
| 4,463,944 | 8/1984 | Grantham | 271/213 |

FOREIGN PATENT DOCUMENTS 2062370 12/1970 Fed. Rep. of Germany .

Primary Examiner—H. Grant Skaggs
Attorney, Agent, or Firm—Seed and Berry

[57] ABSTRACT

A device for counting, inspecting, sorting, and stacking planar food products such as tortillas. The tortillas are sandwiched between a pair of conveyor belts moving at the same speed to a discharge location between a pair of rollers around which the respective conveyor belts extend. The speed of the tortillas causes them to be flung from between the rollers onto a discharge tray. A counter determines when a predetermined number of tortillas have been discharged onto the discharge tray. The counter then triggers an actuator to remove the tray from beneath the stack of tortillas, thereby allowing them to fall onto a discharge conveyor belt. The discharge conveyor belt is then moved an incremental distance. The tortillas passing through the device are scanned in order to detect defective tortillas. When a defective tortilla is found, one of the rollers at the discharge location is shifted, thereby altering the path of the tortillas flung from the conveyor belts at the discharge location onto a reject discharge conveyor belt.

12 Claims, 6 Drawing Sheets

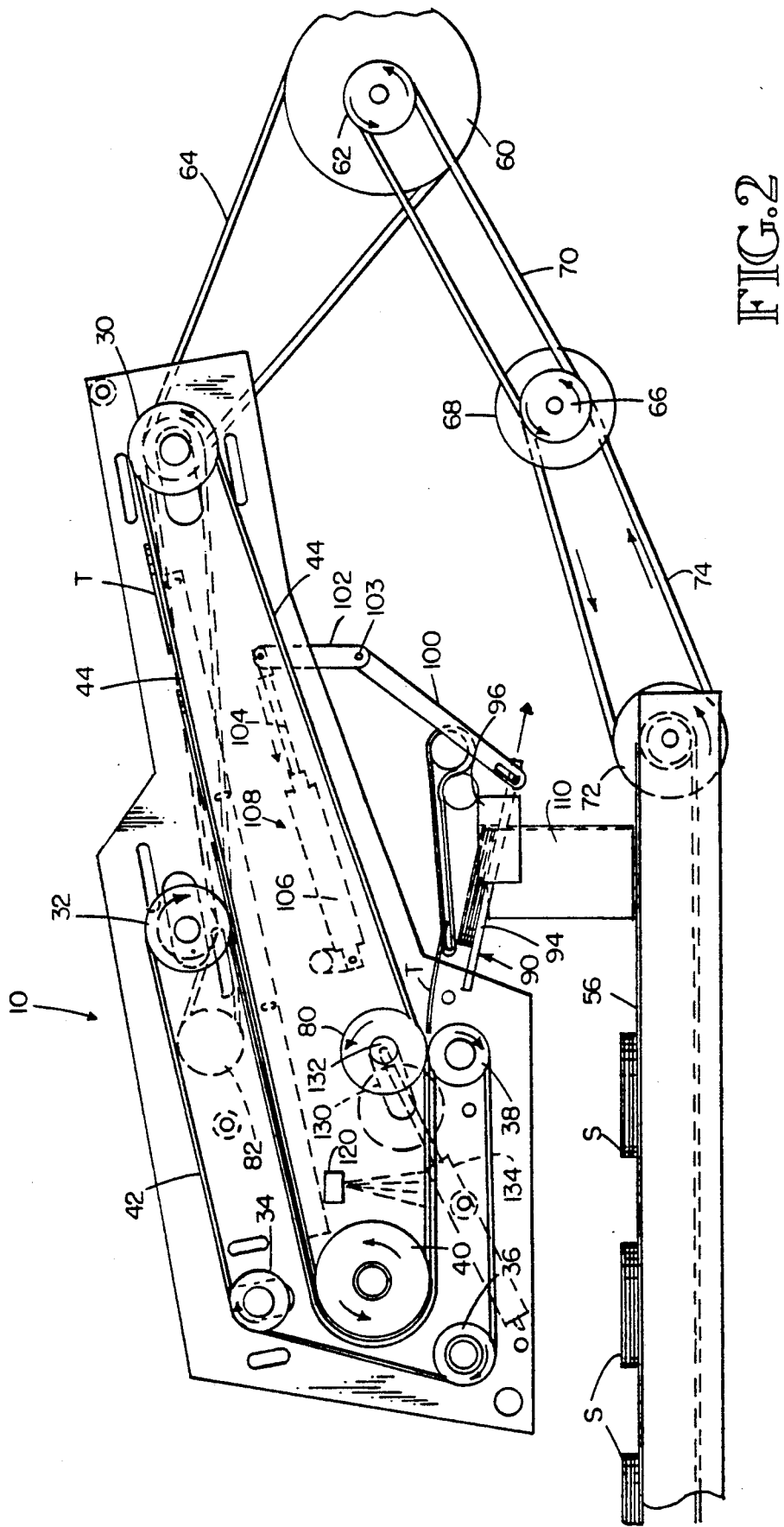

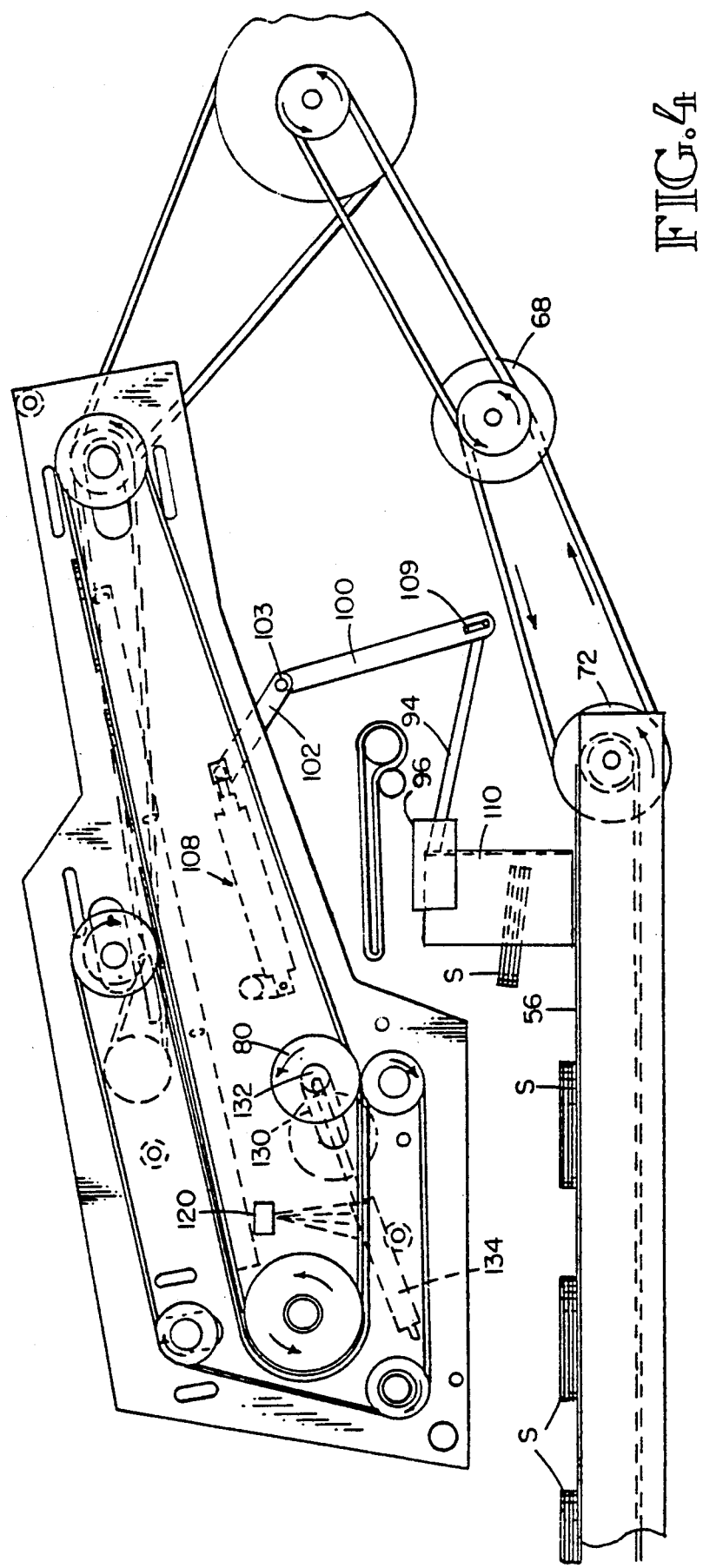

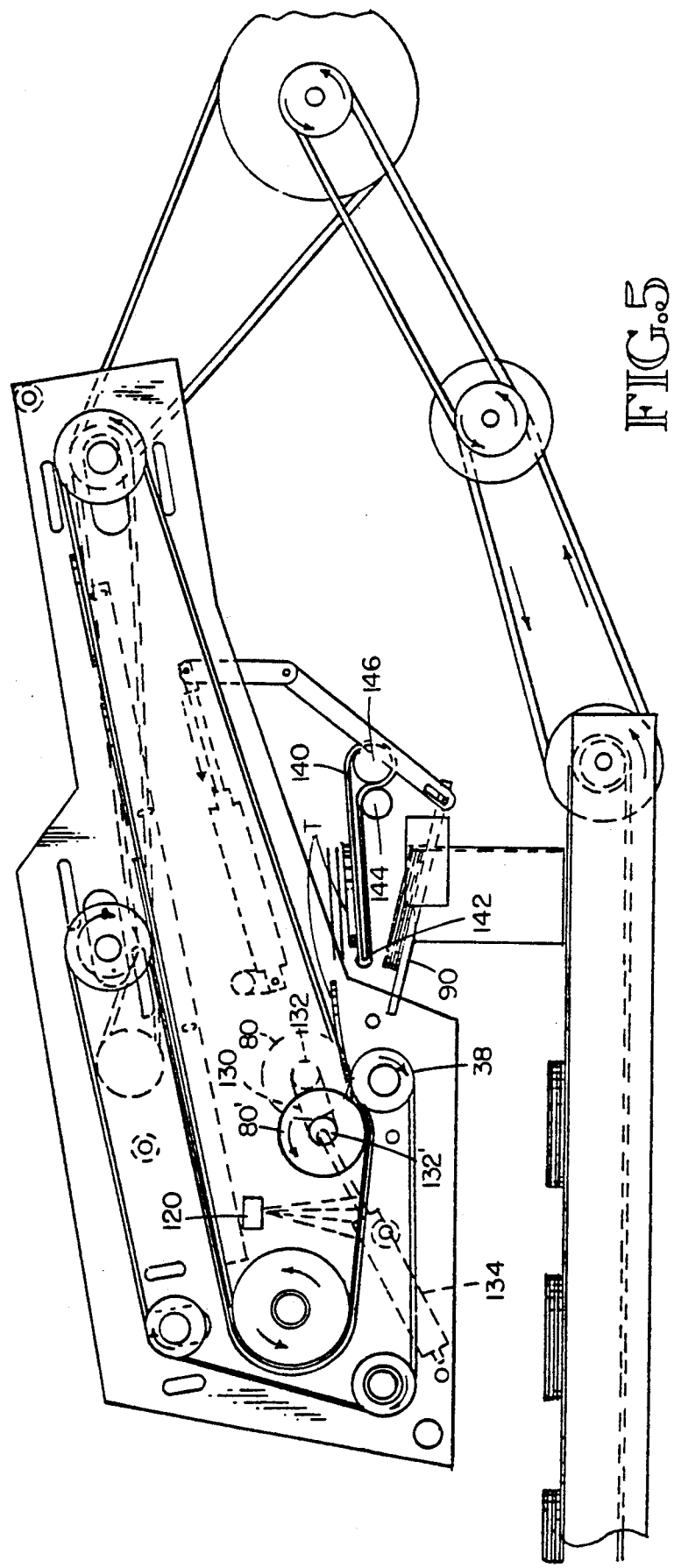

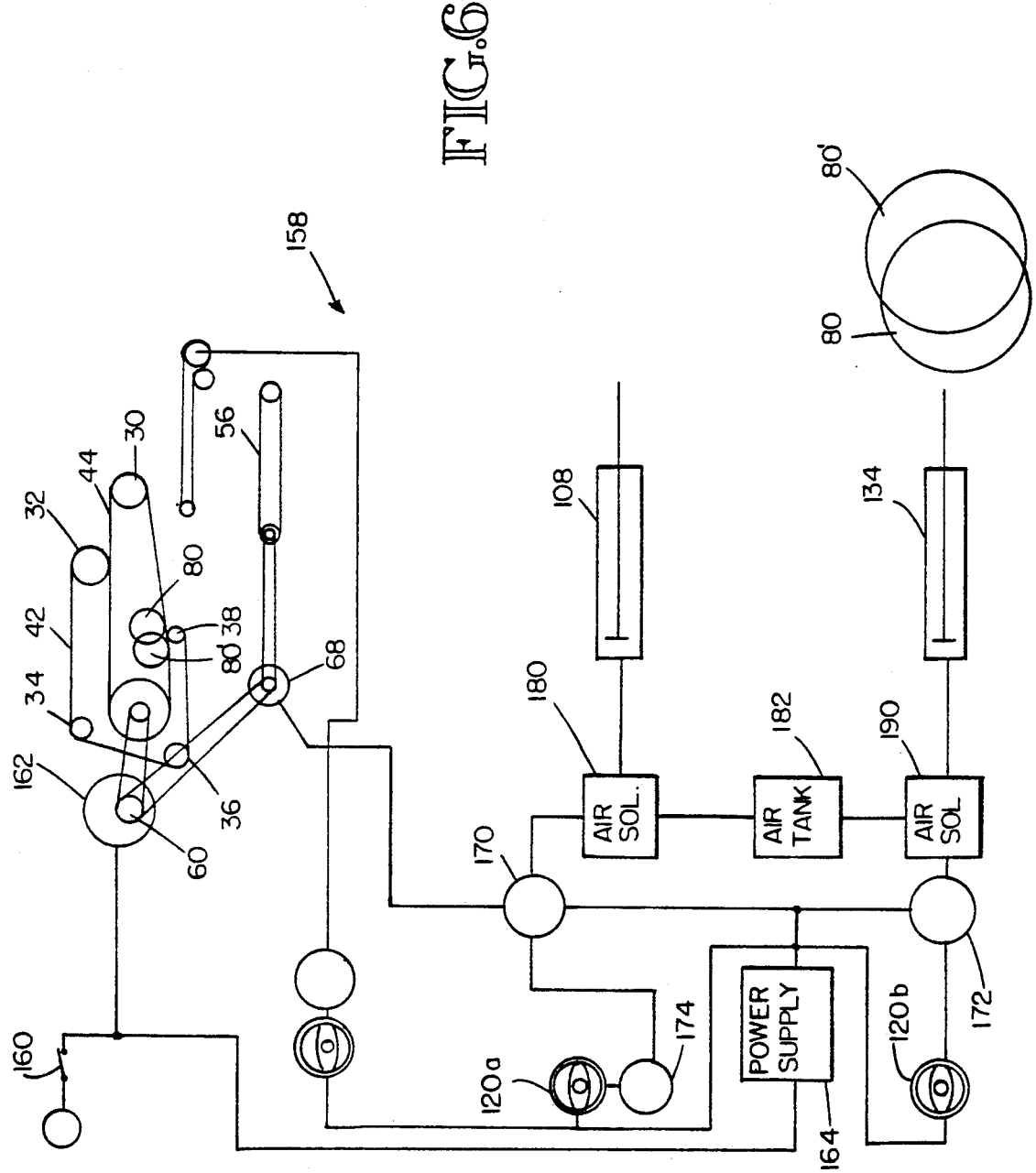

STACKING, COUNTING AND SORTING DEVICE FOR FLEXIBLE, PLANAR FOOD PRODUCTS

FIELD OF THE INVENTION

This invention relates to food handling equipment, and more particularly to equipment for counting and stacking flexible food products, such as tortillas, and for sorting out defective products prior to stacking.

BACKGROUND ART

A significant portion of the cost of manufacturing certain food products results from the labor costs and handling such products during manufacturing and/or packaging. For example, flexible, planar food products such as tortillas are generally discharged from an oven or other processing machine in a randomly spaced sequence. Some of these tortillas may be defective such as, for example, by containing holes or being misshaped or of improper size. After being discharged from the oven or other processing machine, the tortillas are visually inspected, and defective tortillas are manually removed. The remaining tortillas are then hand counted and stacked prior to being packaged. The labor costs incurred in manually inspecting, sorting out defective product, counting and stacking the tortillas is a significant portion of their manufacturing cost.

The requirement that the process of inspecting, sorting, counting, and stacking be done manually limits the speed at which tortillas can be packaged after being discharged from and oven.

In an attempt to eliminate or reduce the expense and speed limitations inherent in manual processing of tortillas, various devices for stacking and counting tortillas have been developed. One such device, disclosed in U.S. Pat. No. 4,006,831, discloses an apparatus for stacking tortillas in which tortillas are placed on a moving conveyor belt and then flung from that belt against aligning arms. The tortillas then fall into a stationary tray. When a predetermined number of tortillas have been stacked on the tray, the tray is lowered so that the tortillas can be removed by a moving conveyor belt after the aligning arms have been pivoted downwardly to allow the stack of tortillas to move with the belt. The apparatus disclosed in U.S. Pat. No. 4,006,831 does mechanize several tortilla processing steps that were previously performed manually. However, it is still somewhat limited in its ability to count and stack tortillas, and in the speed at which it can count and stack tortillas.

U.S. Pat. No. 4,530,632 discloses an improved counting and stacking device for tortillas which is capable of handling tortillas having a wider variety of characteristics at a faster rate than the device disclosed in U.S. Pat. No. 4,006,831. The device disclosed in U.S. Pat. No. 4,530,632 receives tortillas on a moving belt which, after passing through a counting station, makes a 180° turn so that the tortillas are then carried on the underside of the belt. A vacuum holds the tortillas against the belt until they reach a discharge station. The tortillas then drop onto a stationary tray. After a predetermined number of tortillas have been dropped onto the tray, a conveyor belt is lifted to engage the stacked tortillas thereby removing the stack from the discharge tray. Since the conveyor belt removes the stack of tortillas in the direction opposite the direction that the tortillas are delivered to the tray, the time required to remove the tortillas from the tray before additional tortillas may be stacked is minimized. As a result, the throughput of the device disclosed in U.S. Pat. No. 4,530,632 is relatively high.

Although the device disclosed in U.S. Pat. No. 4,530,632 represents a significant improvement in the art, it nevertheless has a number of limitations. First, it has no provision for either inspecting the tortilla for defects or for sorting out defective tortillas prior to stacking. As a result, the tortillas must be inspected manually prior to reaching the counting and stacking device. If any defective tortillas are overlooked prior to reaching the counting and stacking device, they will be stacked along with the other tortillas since tortillas cannot be easily removed from the equipment prior to stacking. Removal of a defective tortilla from the stack of tortillas is possible, but the resulting stack would then contain less than the proper number of tortillas.

Another limitation of the device disclosed in U.S. Pat. No. 4,530,632 is the limited throughput of the device. Although the device disclosed in U.S. Pat. No. 4,530,632 is markedly faster than previous devices, it is nevertheless undesirably slow for many applications. One speed limiting factor is the time needed to remove the stack of tortillas from the discharge tray before additional tortillas can be stacked on that tray. More specifically, additional tortillas cannot be stacked on the discharge tray until the upper tortilla in the stack has cleared the path that the next tortilla would follow as it is dropped from the conveyor onto the discharge tray. Yet the speed at which the stack can be accelerated and then moved from the discharge tray without disturbing the stack is limited.

Another speed limiting factor arises from tolerances in the time required for a tortilla to travel on a conveyor belt from a counting or position measuring station to the point that the tortilla is discharged from a conveyor belt. The time required for a tortilla to travel from a counting or position measuring station to the discharge point is theoretically a constant function of the conveyor belt speed. However, tortillas traveling on a conveyor belt typically undergo some slippage on the belt because of such factors as air resistance. Thus, since the discharge type can vary somewhat, extra time must be allowed for removal of the stack of tortillas from beneath the discharge location.

DISCLOSURE OF THE INVENTION

It is an object of the invention to provide a device for not only stacking and counting tortillas, but also for inspecting the tortillas for defects and then sorting out defective tortillas prior to counting and stacking.

It is another object of the invention to provide a device for counting and stacking tortillas that is capable of a substantially higher throughput than conventional tortilla counting and stacking devices.

It is still another object of the invention to provide an improved device for counting and stacking tortillas that transports tortillas on a conveyor belt without slippage so that the time at which the tortillas will be discharged from the belt can be accurately predicted.

It is a further object of the invention to provide an improved device for counting, stacking, inspecting and sorting out defective tortillas that uses proven technology and is relatively inexpensive.

These and other objects of the invention are provided by an apparatus for stacking flexible, planar food products including a first and second conveyor belts extending around respective rollers which are mounted close to each other in a generally parallel relationship. The first and second conveyor belts travel at the same speed and extend parallel to and closely adjacent each other prior to reaching the first and second rollers. As a result, food products sandwiched between the first and second belts travel without slippage prior to being discharged from a discharge location between the rollers.

According to one aspect of the invention, the device includes a discharge tray mounted beneath the discharge location at a position allowing the food products to be discharged onto the discharge tray. When a counter determines that a predetermined number of food products have been discharged, the discharge tray is moved transversely at a speed that is sufficient so that the inertia of the stack of food products keeps them in position as the tray is removed from beneath said stack. The stack then falls onto a discharge conveyor belt that is positioned beneath the discharge tray.

In another aspect of the invention, one of the rollers at the discharge location is movable between first and second positions along a arcuate path having a center of curvature that is coincident with the central axis of the other roller. Moving the roller between its first and second position alters the angle of a discharge plane that is tangent to the first and second rollers at the discharge location. The discharge plane extends closer to the discharge tray when the roller is in its first position and it extends closer to a reject conveyor belt when the roller is in its second position. As a result, food products are discharged onto the discharge tray when the roller is in its first position, and they are discharged onto the reject conveyor belt when the roller is in its second position. The device also includes a scanner for inspecting the food products for defects. The movable roller is left in its first position unless the scanner detects a defective product, in which case the roller is moved to its second position. As a result, satisfactory food products are stacked on the first tray, and defective articles are stacked on the second tray.

BRIEF DESCRIPTION OF THE DRAWINGS

FIG. 2 is a cross-sectional view of the embodiment of FIG. 1 taken along the line 2—2 of FIG. 1 showing tortillas being stacked onto a movable discharge tray

FIG. 4 is a cross-sectional view taken along the line 4—4 of FIG. 1 showing tortillas being discharged from the movable discharge tray.

FIG. 5 is a cross-sectional view taken along the line 5—5 of FIG. 1 showing the manner in which defective tortillas are removed so that they are not stacked with the remaining tortillas.

FIG. 6 is a block diagram of a sensing and control system used in the embodiment of FIG. 1.

BEST MODE FOR CARRYING OUT THE INVENTION

Figure 1:
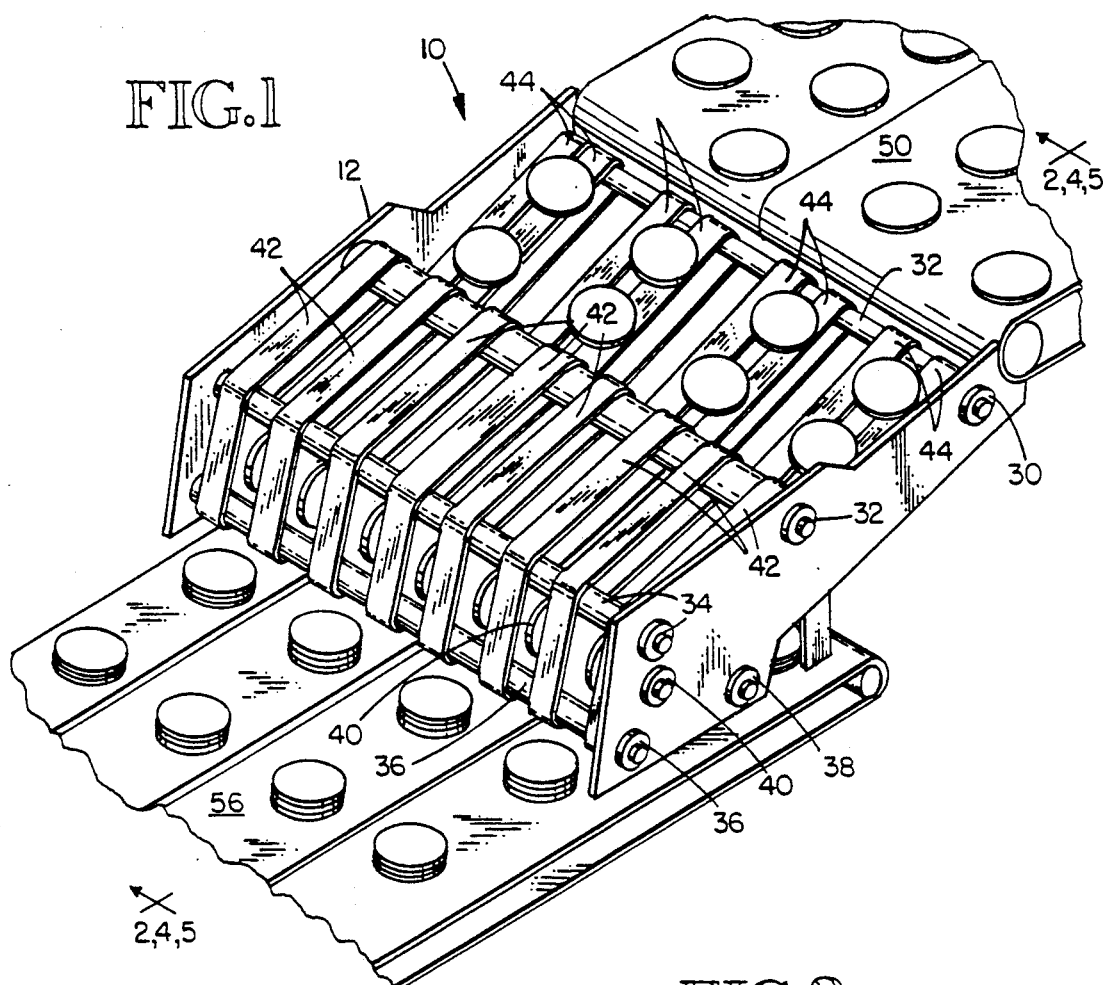
FIG. 1 is an isometric view of one embodiment of the improved device for counting, stacking, inspecting and selectively rejecting tortillas.

A preferred embodiment of a device 10 for counting, stacking, and inspecting defective tortillas is illustrated in FIG. 1. The device 10 includes a pair of side frames 12, 14. A plurality of rollers 30-40 are rotatably mounted in the frames 12, 14 by suitable bearings. A first set of flexible conveyor belts 42 extend around the rollers 32, 34, 36, 38 and 40, as explained in greater detail below. A second set of flexible conveyor belts 44 extend around the rollers 30, 40 and an internal roller (not shown) described in greater detail below.

In operation, tortillas T are carried to the device 10 on the upper surface of a continuously moving conveyor belt 50. The conveyor belt 50 terminates at a roller 52 so that the tortillas T are loaded onto the conveyor belts 44. The operation of the device 10 as the tortillas T are carried through the device 10 will be explained in detail below. However, the tortillas T are ultimately discharged onto an intermittently driven discharge conveyor belt 56 in the form of stacks containing a predetermined number of tortillas.

The internal structure of the device 10 is best illustrated with reference to FIG. 2. The conveyor belts 42, 44, 56 are driven by a continuously rotating electric motor (not shown in FIG. 2) having a relatively large output sheave 60 and a relatively small output sheave 62. The large sheave 60 rotates roller 30 through a drive belt 64. The small sheave 62 rotates a sheave 66 on a pneumatically actuated clutch/brake 68 through a drive belt 70. The electrically actuated clutch 68 intermittently drives a roller 72 through a drive belt 74. The roller 72 drives the discharge conveyor belt 56 whenever the clutch/brake 68 is actuated. Other mechanisms for intermittently driving the discharge conveyor belt 56 can also be used.

As mentioned above, the tortillas T are initially loaded onto the conveyor belt 44 which is driven by roller 30. The conveyor belt 44 then drives the remaining rollers 40 and 80.

The other conveyor belt 42 is driven by roller 32 which is, in turn, driven by drive belt 64 through an idler roller 82. The conveyor belt 42 then drives rollers 34, 36, 38, and 40. The idler roller 82 is provided to essentially reverse the direction of the belt 42. As a result, the abutting bottom portion of the belt 42 and upper portion of the belt 44 move in the same direction.

As the tortillas T are carried downwardly on the belt 44 and reach the roller 32, they are sandwiched between belt 42 and belt 44. The tortillas T remain sandwiched between the belts 42, 44 as they are conveyed past the roller 40 to a discharge location between the rollers 80 and 38. At the discharge location, the belt 42 reverses direction at roller 38, while the belt 44 angles upwardly at roller 80. The high speed of the belts 42, 44 imparts considerable momentum to the tortillas. As a result, the tortillas T are flung from the belts 42, 44 at the discharge location onto a discharge tray 90.

Figure 3:
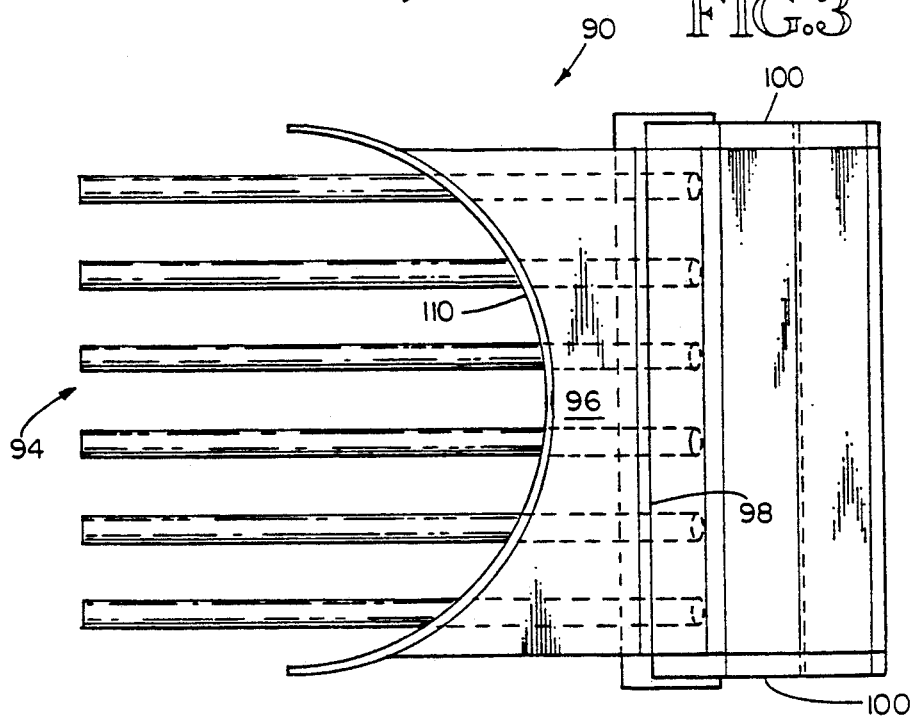
FIG. 3 is a top plan view of a discharge tray for collecting tortillas used in the embodiment of FIG. 1.

With reference also, to FIG. 3, the tray 90 is formed by a plurality of parallel tines 94 slidably mounted in a UHMW block 96. The rightmost ends of the tines 94, (when viewed in FIG. 2) are connected to each other by a bar 98 which is, in turn, connected to two pairs of first and second links 100, 102, respectively, pivotally mounted to the frames 14, 16, respectively, at 103. The upper portion of link 102 is connected to the actuating rod 104 of a pneumatic cylinder 106 which together form a hydraulic actuator 108. When a predetermined number of tortillas have been stacked on the tray 90, the actuator 108 is energized thereby drawing the rod 104 to the left, as best illustrated in FIG. 4.

The device 10 is illustrated in FIG. 4 with the actuator 108 energized. (For purposes of clarity, references numerals for components that are not discussed in this section have been omitted from FIG. 4.) When the actuator 108 is energized, the pivotal movement of the links 100, 102 draws the tines 94 through the block 96 so that the stack of tortillas is no longer supported by the tines 94. A slot 109 formed at the lower end of the lower link 102 allows the tines to move linearly in the block 96 as the lower end of the link 102 moves in an arc. Once the tines 94 have been removed from beneath the stack of tortillas, the stack S drops onto the discharge conveyor belt 56. The pneumatic clutch/brake 68 is then actuated for a predetermined period to carry the stack S a predetermined distance from beneath the tray 90.

As also illustrated in FIG. 3, a partial cylindrical cut-out is formed in the block 96 in order to maintain the cylindrical configuration of the stack S of tortillas. The cylindrical configuration of the stack S as it falls to the discharge conveyor belt 56 is also maintained by a partial cylindrical guide 110 positioned between the partial cylindrical cut-out of the block 96 and the discharge belt 56.

The actuator 108 and pneumatic clutch/brake 68 are operated by a sensing and control system described in greater detail below. The sensing and control system includes an optical scanner 120 of conventional design which examines the individual tortillas passing beneath the scanner 120 to both count the tortillas and the examine them for defects. The scanner 120 can use a variety of techniques to detect defective tortillas. For example, the scanner 120 can examine discrete areas of the tortilla T to be sure that the tortilla has no holes and is the proper size.

The use of the scanner 120 for counting allows the sensing and control system to determine when a predetermined number of tortillas have been stacked on the discharge tray 90 in order to energize the actuator 108 and pneumatic clutch/brake 68. The scanner 120 also allows the sensing and control system to determine the position of the final tortilla in a stack, i.e., when the final tortilla in a stack has reached the scanner 120. The time required for the final tortilla to reach the discharge location between the rollers 38, 80 can be accurately predicted because the tortilla is sandwiched between the conveyor belts 42, 44 and thus does not slip on the belts 42, 44.

The stacking and discharge structure used in the inventive device provides a substantially faster throughput than prior art counting and stacking devices. This speed advantage is primarily a result of the use of a removable discharge tray which allows the stack S to fall downwardly so that it more quickly clears the path of the first tortilla to be placed on the next stack. In fact, the discharge tray 90 can be moved back to its collection position as soon as the upper tortilla on the stack S has cleared the tray 90, and the tortillas can be discharged between the rollers 38, 80 so rapidly that a tortilla can be released from between the belts 42, 44 even while the tray 90 is being moved back to its collection position. In contrast, prior art approaches have required that the stack S be moved transversely before the first tortilla of the next stack can be received. This prior art approach is substantially slower than the approach used in the inventive device.

As mentioned above, the inventive device 10 is also capable of inspecting tortillas for defects and, if a defective tortilla is found, sorting out the tortilla from the remainder of the tortillas so that the defective tortilla is not placed in a stack. The structure for sorting out defective tortillas is explained with reference to FIGS. 2, 5 and 7. As illustrated in FIG. 2, the roller 80 is rotatably mounted on a shaft 132 which is, in turn, mounted in an arcuate slot 130. The shaft 132 is moved between first and second positions at opposite ends of the slot 130 by an actuator 134. When the shaft 132 is in the position illustrated in FIG. 2, the tortillas T are directed onto the discharge tray 90, as illustrated in FIG. 2. The tortillas T are flung onto the discharge tray 90 because a discharge plane that is tangent to the rollers 80, 38 extends toward the tray 90.

When a defective tortilla is detected by the scanner 120, the pneumatic actuator 134 is energized thereby moving the shaft 132 is to the opposite end of the slot 130, as illustrated in FIG. 5. In this position, the roller 80' is at the opposite end of the slot 130 so that the discharge plane that is tangent to the rollers 80', 38 extends upwardly toward a reject conveyor belt 140 which extends around and is driven by rollers 142, 144, 146. As a result, the tortillas T are flung from between the rollers 80, 38 onto the reject conveyor belt 140, as illustrated in FIG. 5.

Figure 7:
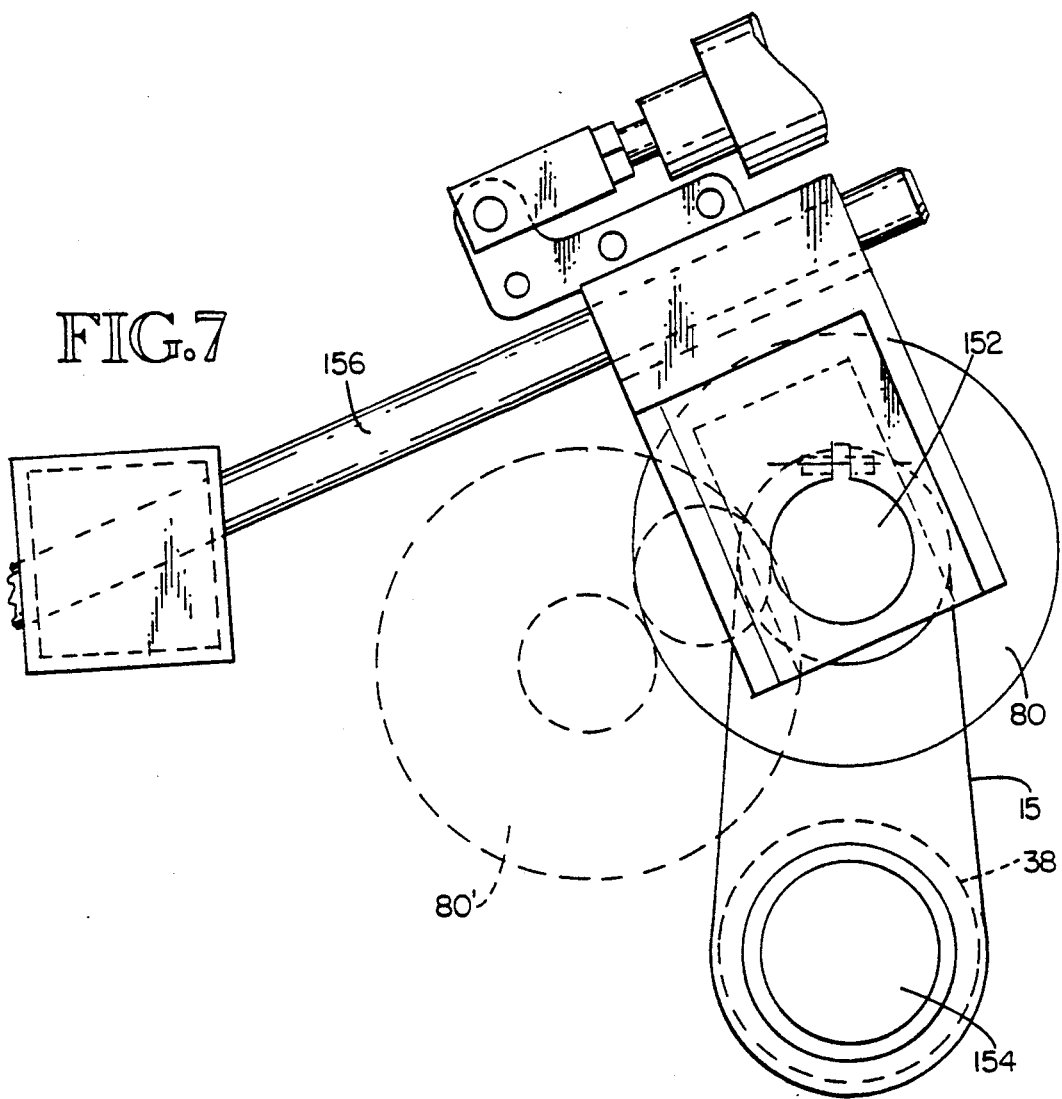
FIG. 7 is a side elevational view showing the mechanism for moving a discharge roller between discharge and reject positions.

It is important that the center of curvature of the arcuate slot 130 coincide with the central axis of the roller 38 so that the distance between the periphery of the roller 38 does not vary as the shaft 132 moves in the slot 130. If the movement of the shaft 132 in the slot 130 caused the periphery of the roller 80 to move closer to the periphery of the roller 38, the tortillas T would be excessively compressed between the rollers 80, 38. The mechanism for ensuring that the spacing between the roller 80 and the roller 38 remains constant is illustrated in FIG. 7. A spacer link 150 is pivotally mounted on a shaft 152 on which the roller 80 is mounted and on a shaft 154 on which the roller 38 is mounted. As a result, the spacer link 150 keeps the centers of the rollers 80, 38 a constant distance apart from each other as the actuating rod 156 forming part of the actuator 134 (FIG. 2) moves.

A block diagram of a sensing and control system 158 for the preferred embodiment of the invention is illustrated in FIG. 6 in which previously described components have been provided with the same reference numerals. Power is applied to the device 10 through an ON/OFF switch 160. When the switch 160 is in its ON position, power is delivered to an electric motor 162 and to a conventional DC power supply 164. The power supply 164 then supplies DC power to the scanner 120, and to two timers 170, 172.

The scanner 120a sends a pulse to a conventional counting device 174 each time that a tortilla passes beneath the scanner 120. The counting device 174 can be preset to a variety of numbers. When the number of pulses counted by the counting device 174 reaches the preset number, the counting device 174 outputs a trigger pulse to the conventional timer 170. The timer 170 is a conventional device that, when triggered with a pulse, outputs a pulse having a presettable duration. Thus, when the timer 170 receives a trigger pulse from the counting device 174, it applies a pulse having a preset duration to a conventional pneumatic solenoid 180. The solenoid 180 then connects a compressed air supply 182 to one side of a cylinder in the pneumatic actuator 108 for the duration of the pulse from the timer 170. As explained above, the actuator 108 moves the discharge tray 90 (FIG. 4) from beneath the stack S of tortillas, thus allowing them to fall onto the discharge conveyor 56.

At the termination of the pulse from the timer, the solenoid 180 connects the compressed air supply 182 to the other side of a cylinder in the actuator 108 so that the discharge tray 90 is returned to its catching position.

Each time the timer 170 is triggered by the counter 174, it also outputs a pulse having a preset duration to a second pneumatic solenoid 188. The pneumatic solenoid 188 then connects the air supply 182 to the clutch/brake 68 for the preset period. The clutch/brake 68 couples the motor 162 to the discharge conveyor 56 (FIG. 2) for the duration of the preset pulse from the timer 170 to cause the discharge belt 56 to move an incremental distance, thereby removing a stack of tortillas from beneath the discharge tray 90.

As explained above, the scanner 120b also detects defects in the tortillas passing beneath the scanner 120. When a defective tortilla is detected, the scanner 120b applies a trigger pulse to the timer 172. The timer 172 operates in the same manner as the timer 170 to actuate pneumatic solenoid 190 in one direction for a preset period thereby allowing air to flow from air supply 182 to the actuator 134. The actuator 134 then moves the reject roller 80 to the position illustrated in FIG. 5, thereby flinging the defective tortilla onto the reject tray 140. After the period preset in the timer 172, which is sufficient to allow the defective tortilla to reach the reject tray, the solenoid 190 is actuated in the other direction, thereby moving the roller 80 back to its original position.

It is thus seen that the inventive device for counting, inspecting, sorting and stacking planar food products has a significantly higher througput as compared to conventional devices. Furthermore, it eliminates the expense and time required to manually inspect tortillas and sort out defective tortillas.

I claim:

1. An apparatus for stacking flexible, planar food products, said apparatus comprising:
    a first conveyor belt extending around a first roller;
    a second conveyor belt extending around a second roller, said first and second rollers being mounted close to each other in a generally parallel relationship, said first and second conveyor belts traveling at the same speed and extending parallel to and closely adjacent each other prior to reaching said first and second rollers so that said food products can be sandwiched between said first and second belts prior to reaching said first and second rollers and are discharged from a discharge location between said first and second belts as said first and second belts extend around said first and second rollers;
    a discharge tray mounted beneath said discharge location at a position spaced from said discharge location in the direction that said food products are traveling as they reach said discharging location so that said food products are discharged onto said discharge tray;
    counting means for counting the number of said food products that have been discharged onto said discharge tray;
    a discharge conveyor positioned beneath said discharge tray, said discharger conveyor being selectively moved in response to a discharge conveyor actuator signal;
    actuator means for selectively moving said discharge tray transversely while said discharge tray remains in substantially the same angular orientation in response to a discharge tray actuator signal, said discharge tray moving at a speed that is sufficient so that the inertia of a stack of said food products allows said discharge tray to be removed from beneath said stack without transversely moving said stack so that said stack falls onto said discharge conveyor belt;
    control means responsive to said counter means for generating said discharge tray actuator signal and said discharge conveyor actuator signal for respective predetermined periods when said counter means counts a predetermined number of said food products;
    a reject conveyor mounted above said discharge tray;
    inspection means for examining said food products for defects prior to reaching said discharge location and for generating a defect signal in response thereto;
    actuating means for moving the central axis of one of said rollers between first and second positions along an arcuate path having a center of curvature that is coincident with the central axis of the other of said roller thereby altering the angle of a discharge plane that is tangent to said first and second rollers at said discharge location, said discharge plane extending closer to said discharge tray when said roller is in its first position and said discharge plane extending closer to said reject tray when said roller is in its second position so that said food products are discharged onto said discharge tray when said roller is in its first position and said food products are discharged onto said reject conveyor when said roller is in its second position; and
    actuator control means operatively connected to said inspection means and said actuating means for leaving said roller in its first position unless said inspection means generates said defect signal, and for moving said roller to its second position when said inspection means generates said defect signal, whereby said satisfactory food products are stacked on said discharge tray and said defective articles are stacked on said reject conveyer.

2. The apparatus of claim 1 wherein said first conveyor belt is positioned above said second conveyor belt, and wherein said first conveyor belt starts at a location that is offset from the start of said second conveyor belt so that the upper surface of said second conveyor belt is exposed before being covered by the underside of said first conveyor belt, and wherein said food products are loaded into said apparatus by placing said food products onto the exposed surface of said second conveyor belt before said food products are sandwiched between the upper surface of said second conveyor belt and the underside of said first conveyor belt.

3. The apparatus of claim 2 wherein said first and second conveyor belts extend around a common roller to alter the direction of travel of said food products by 180 degrees prior to reaching said discharge location whereby said second conveyor belt is positioned above said first conveyor belt after said conveyor belts extend around said roller.

4. The apparatus of claim 1 wherein said counting means includes an optical scanner positioned at a location upstream from said discharge location where said food products are sandwiched between said first and second conveyor belts.

5. An apparatus for stacking flexible, planar food products, said apparatus comprising:
- a conveyor assembly for conveying said food products to a discharge location where said food products are discharged in the same direction that they are traveling upon reaching said discharge location;
- a discharge tray mounted beneath said discharge location at a position spaced from said discharge location in the direction that said food products are traveling as they reach said discharge location so that said food products are discharged onto said discharge tray; said discharge tray including:
  - a plurality of elongated, spaced apart tines extending beneath said food products; and
  - a support block having a plurality of through bore holes through which said tines extend whereby said discharge tray may be withdrawn from beneath a stack of said food products by drawing said tines through said bores, said support block further including a partially cylindrical cutout formed in a vertical wall of said block through which said tines extend, said cutout having a curvature substantially matching the periphery of said food products so that said cutout assists in maintaining the vertical alignment of said stack;
- counting means for counting the number of said food products that have been discharged onto said discharge tray;
- a discharge conveyor positioned beneath said discharge tray, said discharge conveyor being selectively moved in response to a discharge conveyor actuator signal;
- actuator means for selectively moving said discharge tray transversely while said discharge tray remains in substantially the same angular orientation in response to a discharge tray actuator signal, said discharge tray moving at a speed that is sufficient so that the inertia of a stack of said food products allows said discharge tray to be removed from beneath said stack without transversely moving said stack so that said stack falls onto said discharge conveyor belt; and
- control means responsive to said counter means for generating said discharge tray actuator signal and said discharge conveyor actuator signal for respective predetermined periods when said counter means counts a predetermined number of said food products.

6. An apparatus for counting and stacking flexible, planar food products, and sorting defective and satisfactory food products in separate stacks, said apparatus comprising:
- a first conveyor belt extending around a first roller;
- a second conveyor belt extending around a second roller, said first and second rollers being mounted close to each other in a generally parallel relationship, said first and second conveyor belts traveling at the same speed and extending parallel to and closely adjacent each other prior to reaching said first and second rollers so that said food products may be sandwiched between said first and second belts prior to reaching said first and second rollers and are discharged from a discharge location between said first and second belts as said first and second belts extend around said first and second rollers;
- a first catching surface mounted beneath said discharge location at a position spaced from said discharge location in the direction that said food products are traveling as they reach said discharge location
- a second catching surface mounted above said first catching surface at a position spaced from said discharge location in the direciton that said food products are traveling as they reach said discharge location;
- inspection means for examining said food products for defects prior to reaching said discharge location and for generating a defect signal in response thereto;
- actuating means for moving the central axis of one of said rollers between first and second positions along an arcuate path having a center of curvature that is coincident with the central axis of the other of said rollers thereby altering the angle of a discharge plane that is tangent to said first and second rollers at said discharge location, said discharge plane extending closer to said first catching surface when said roller is in its first position and said discharge plane extending closer to said second catching surface when said roller is in its second position so that said food products are discharged onto said first catching surface when said roller is in its first position and said food products are discharged onto said second catching surface when said roller is in its second position; and
- control means operatively connected to said inspection means and said actuating means for leaving said roller in its first position unless said inspection means generates said defect signal, and for moving said roller to its second position when said inspection means generates said defect signal, whereby said satisfactory food products are stacked on said first catching surface and said defective articles are stacked on said second catching surface.

7. The apparatus of claim 6 wherein said first catching surface is formed by a discharge tray and said second catching surface is formed by a reject conveyor belt.

8. The apparatus of claim 6 wherein said inspection means includes an optical scanner positioned at a location upstream from said discharge location where said food products are sandwiched between said first and second conveyor belts.

9. A method of counting and stacking planar food products, comprising:
- conveying said food products to a discharge location and flinging said food products in a first direction at said discharge location;
- catching a plurality of said food products flung from said discharge location on a discharge tray, thereby forming a stack of said food products on said discharge tray;
- counting the number of said food products that have been stacked on said discharge tray;
- transversely withdrawing said discharge tray from beneath said stack of food products while maintaining the angular orientation of said discharge tray substantially constant, said discharge tray being withdrawn at a sufficient speed that said discharge tray is removed from beneath said stack without transversely moving said stack, and keeping said discharge tray in its withdrawn position for a sufficient time to allow said stack to fall onto a collection area;

periodically removing stacks of said food products from said collection area;

providing a reject conveyor belt mounted vertically adjacent said discharge tray;

inspecting said food products for defects prior to reaching said discharge location; and altering the angle of the path that said food products follow as they are flung from said belts at said discharge location between a first path extending closer to said discharge tray when said food products are found to be satisfactory during said inspection, and a second path extending closer to said reject conveyor belt when said food products are found to be defective during said inspection so that said satisfactory food products are stacked on said discharge tray and said defective articles are carried away by said reject conveyor belt.

10. A method of sorting defective and satisfactory food products, said method comprising:

sandwiching said food products between a pair of conveyor belts traveling in the same direction at the same speed;

terminating said conveyor belts at a discharge location so that said food products are flung from said belt at said discharge location along a discharge path;

catching a plurality of said food products flung from said discharge location on either a discharge surface or a reject surface positioned vertically adjacent said discharge tray;

inspecting said food products for defects prior to reaching said discharge location;

altering the angle of said discharge path between a first path extending closer to said discharge surface when said food products are found to be satisfactory during said inspection, and a second path extending closer to said reject surface when said food products are found to be defective during said inspection so that said satisfactory food products are placed on said discharge surface and said defective articles are placed on said reject surface.

11. An apparatus for stacking a flexible, planar food products, said apparatus comprising:

a conveyor for conveying said food products to a discharge location where said food products are discharged in the same direction that they are traveling upon reaching said discharge location;

a discharge tray mounted beneath said discharge location at a position spaced from said discharge location in the direction that said food products are traveling as they reach said discharge location so that said food products are discharged onto said discharge tray, said discharge tray including a plurality of elongated interconnected tines extending beneath said food products;

counting means for counting the number of said food products that have been discharged onto said discharge tray;

a discharge conveyor positioned beneath said discharge tray, said discharge conveyor being selectively moved in response to a discharge conveyor actuator signal;

actuator means for selectively moving said discharge tray transversely in response to a discharge tray actuator signal, while said discharge tray remains in substantially the same angular orientation; and a stop member positioned adjacent said discharge tray in the direction that said discharge tray moves so that when said discharge tray moves transversely, the food products on said discharge tray contact said stop member, said stop member preventing further transverse movement of said food products while said discharge tray continues to move transversely from beneath said food products, said stop member including a support block having a plurality of through bores through which said tines extend whereby said discharge tray may be withdrawn from beneath a stack of food products by drawing said tines through said bores, said support block further including a partially cylindrical cutout formed in a vertical wall of said block through which said tines extend, said cutout having a curvature substantially matching the periphery of said food products.

12. The apparatus of claim 11, further including a vertically disposed, partially cylindrical guide extending between said support block and said discharge conveyor to maintain the vertical alignment of said stack as it falls onto said discharge conveyor.

* * * * *

UNITED STATES PATENT AND TRADEMARK OFFICE
CERTIFICATE OF CORRECTION

PATENT NO. : 5,253,762

DATED : October 19, 1993

INVENTOR(S) : Daryl G. Duncan

It is certified that error appears in the above-identified patent and that said Letters Patent is hereby corrected as shown below:

In column 8, claim 1, line 23, please delete "roller" and substitute therefor --rollers--.

Signed and Sealed this

Nineteenth Day of April, 1994

Attest:

BRUCE LEHMAN

Attesting Officer

Commissioner of Patents and Trademarks